(12) United States Patent
Ramsauer

(10) Patent No.: US 6,361,088 B1
(45) Date of Patent: Mar. 26, 2002

(54) CASEMENT FASTENER CLOSURE FOR THICK-WALLED DOORS, SHUTTERS OR THE LIKE

(76) Inventor: Dieter Ramsauer, Am Neuhauskothen 20, D-42555 Velbert (DE)

(*) Notice: Subject to any disclaimer, the term of this patent is extended or adjusted under 35 U.S.C. 154(b) by 0 days.

(21) Appl. No.: 09/581,873
(22) PCT Filed: Dec. 16, 1998
(86) PCT No.: PCT/EP98/08259
§ 371 Date: Jun. 19, 2000
§ 102(e) Date: Jun. 19, 2000
(87) PCT Pub. No.: WO99/32746
PCT Pub. Date: Jul. 1, 1999

(30) Foreign Application Priority Data

Dec. 19, 1997 (DE) ..................................... 297 22 488 U

(51) Int. Cl.[7] ................................................. E05C 3/04
(52) U.S. Cl. ............................... 292/202; 292/DIG. 53; 292/DIG. 60; 403/240
(58) Field of Search ......................... 292/198, DIG. 53, 292/63, 64, 67, 195, 202, DIG. 60; 70/79, 83, 451, DIG. 20; 403/240

(56) References Cited

U.S. PATENT DOCUMENTS

| | | | | |
|---|---|---|---|---|
| 2,852,926 A | * | 9/1958 | Chervenka .................... 70/79 |
| 2,948,141 A | * | 8/1960 | Vahsltrom .................... 70/370 |
| 3,503,233 A | * | 3/1970 | Russell et al. ................ 70/370 |
| 4,381,656 A | * | 5/1983 | Hayakawa .................... 70/451 |
| 4,586,354 A | * | 5/1986 | Smith .......................... 70/451 |
| 4,638,652 A | * | 1/1987 | Morse et al. ................. 70/454 |
| 4,921,289 A | * | 5/1990 | Shen ....................... 292/336.3 |
| 4,930,822 A | * | 6/1990 | Shen .......................... 292/357 |
| 5,845,522 A | * | 12/1998 | Shen .......................... 70/224 |
| 5,961,162 A | * | 10/1999 | Glaser et al. ............... 292/198 |
| 6,279,360 B1 | * | 8/2001 | Shen .......................... 70/224 |

* cited by examiner

Primary Examiner—Robert J. Oberleitner
Assistant Examiner—Benjamin A. Pezzlo
(74) Attorney, Agent, or Firm—Reed Smith LLP

(57) ABSTRACT

A casement fastener closure for thick-walled doors, shutters or the like comprising a housing for rotatable mounting of the actuating shaft of the casement fastener, which housing has, at its circumference, a thread and axially extending flattened portions, wherein a fastening plate provided with a threaded bore hole can be screwed onto the housing and, together with another plate which has an opening that is not round and which can be mounted on the housing so as to be rigid against rotation, can be fastened to the back of the door or shutter by means of wood screws. A recess is formed in one plate, e.g., the plate that can be screwed on, wherein the other plate, e.g., the plate which can be mounted, can be received in the recess so as to be fixed with respect to rotation.

18 Claims, 8 Drawing Sheets

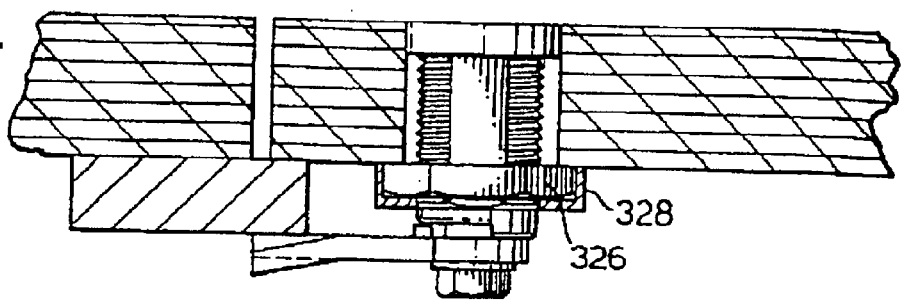
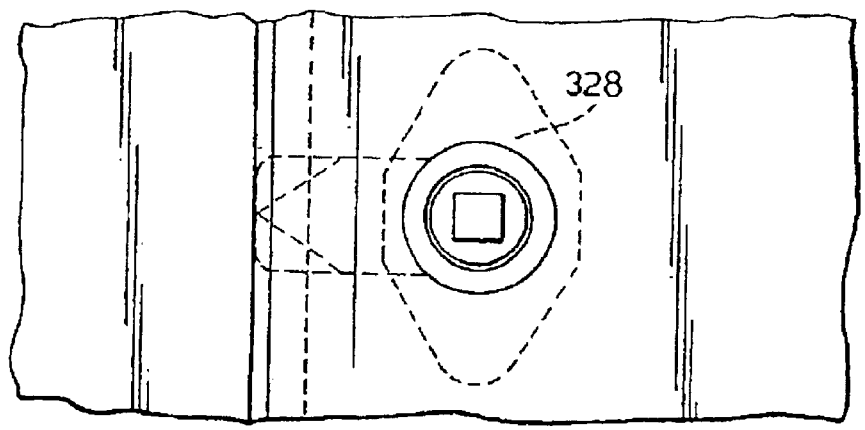
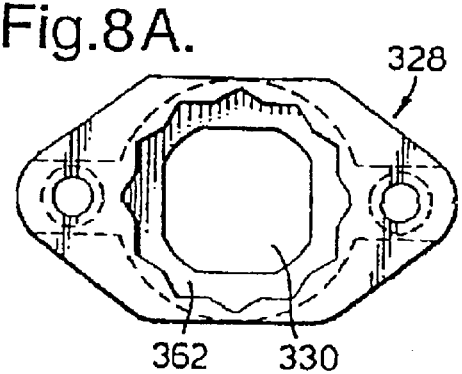
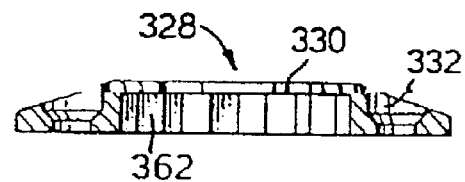
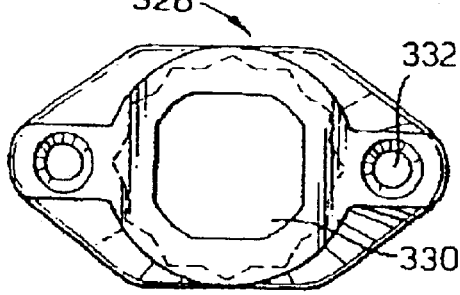
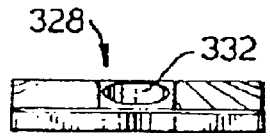
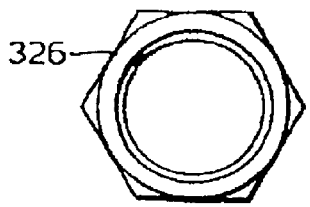

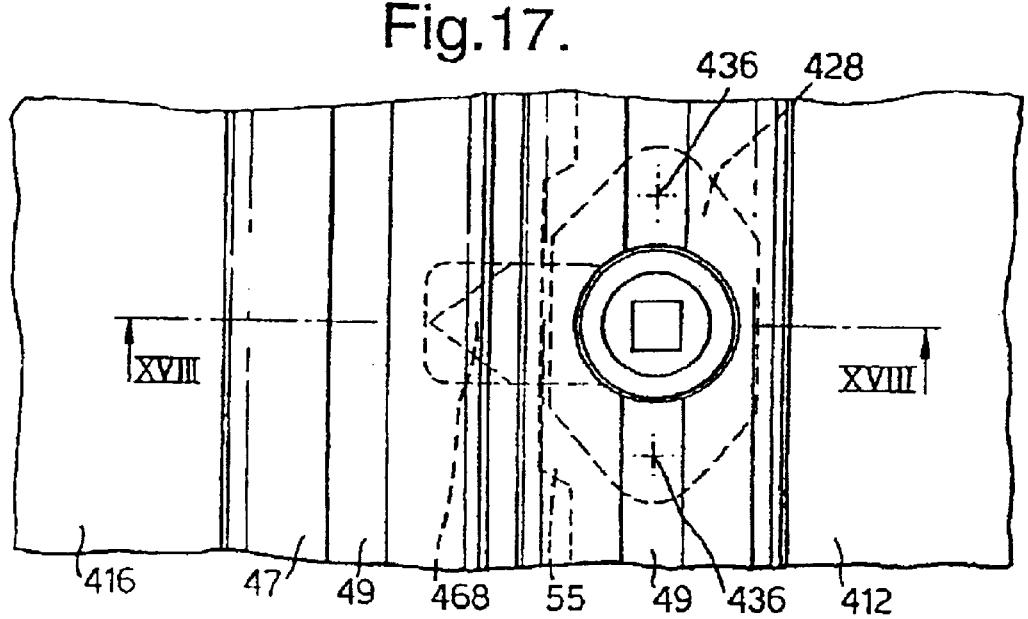
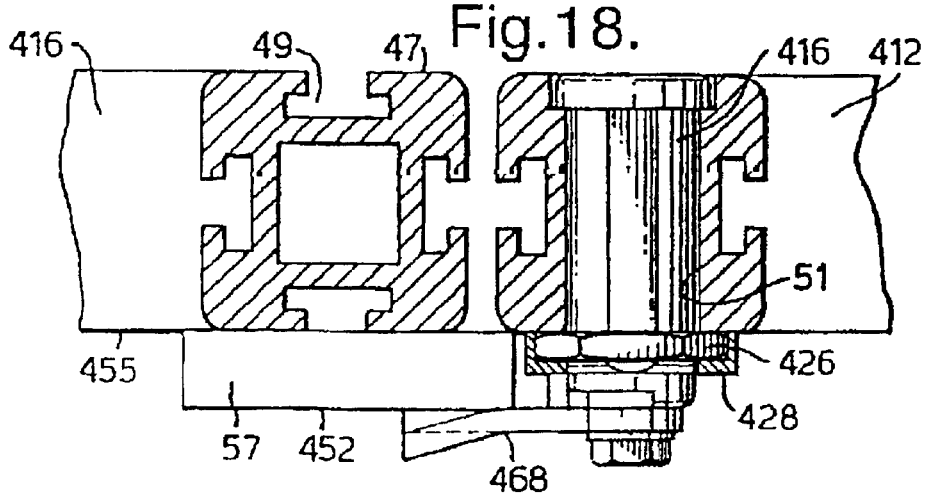
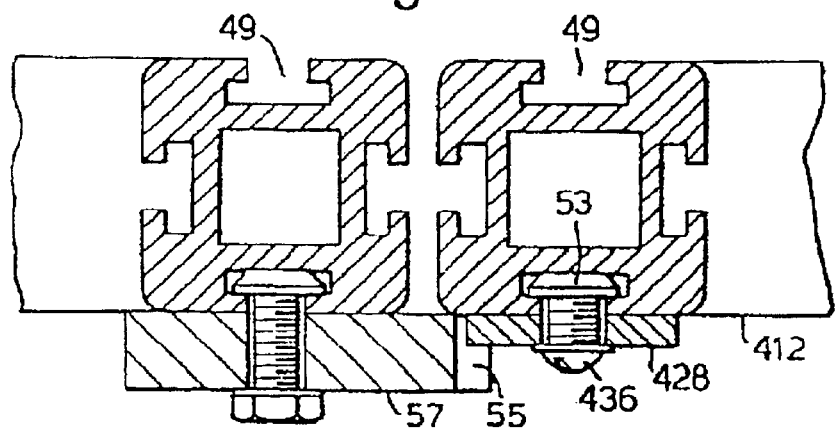

CASEMENT FASTENER CLOSURE FOR THICK-WALLED DOORS, SHUTTERS OR THE LIKE

BACKGROUND OF THE INVENTION

1. Field of the Invention

The invention is directed to a sash fastener closure or casement fastener closure for thick-walled doors, shutters or the like comprising a housing for rotatable mounting of the actuating shaft of the casement fastener, which housing has, at its circumference, a thread and axially extending flattened portions, recesses or the like, wherein a fastening plate provided with a threaded bore hole for the circumferential thread of the housing can be screwed onto the housing and, together with another plate which has an opening that is not round and which can be mounted on the housing so as to be rigid against rotation, can be fastened to the back of the door, shutter or the like by means of wood screws or the like.

2. Description of the Related Art

A casement fastener closure similar to the type mentioned above is already known to the present Applicant. Such casement fasteners are used when the thick-walled doors or shutters have different thicknesses or thicknesses which cannot be exactly determined beforehand and make it possible to adapt the casement fastener closure to these different door thicknesses. Further, the end face of the casement fastener closure should project in front of or behind the front surface of the door leaf or the like as little as possible and should preferably extend flush with the latter. A flush fit of this kind does not allow the housing of the casement fastener closure to have a flange by which it can be supported on the front surface of the door leaf or the like. An embodiment form in which a casement fastener housing of this type provided with a flange is fastened simply by means of a coupling nut arranged on the back is therefore not usable in such cases.

The above-mentioned plates are used to enable radial and axial fastening of the casement fastener housing nevertheless, these plates being fastened to the rear surface of the door leaf or the like preferably by means of two fasteners, e.g., wood screws. A disadvantage consists in occasional problems with respect to mounting and stability.

OBJECT AND SUMMARY OF THE INVENTION

It is the primary object of the invention to eliminate these problems and, further, to provide additional variants of the arrangement mentioned above in order to achieve improved possibilities of adapting to different cases of application.

This object is met in that the plate which can be mounted on the housing forms a depression or recess in which the plate which can be screwed to the housing can be received so as to be fixed with respect to rotation relative to it. Alternatively, the plate which can be screwed to the housing can also have the recess in which the plate which can be mounted can be received so as to be fixed with respect to rotation relative to it.

In both cases, it is possible to adapt to the thickness of the respective door or shutter or the like in that the plate which can be screwed on is screwed onto the thread of the housing to a corresponding extent. The second plate then provides for fixing against rotation, so that an arrangement which is fixed with respect to displacement rotationally and axially is achieved when the one plate is fitted into the other plate and the arrangement is screwed to the back of the door leaf or the like.

The casement fastener closure is preferably constructed in such a way that, in the area for receiving the actuating key, the housing forms a collar or key interceptor projecting over the cross section of the external thread. In a case such as this, it is advantageous when the receivable plate forms a first axial portion having a round outer contour with a diameter which is approximately equal to the outer diameter of the collar and a second receivable cross section with an outer contour which is not round but square and with a maximum diameter like a transverse connection between the oppositely located corners of the square which is greater than the outer diameter of the collar. In this way, it is achieved that the casement fastener housing is securely guided inside the door opening in the area of its front collar as well as in the area of its rear screw fastening.

In order to achieve a particularly sensitive adjustability, the received plate has the shape of a conventional hexagon coupling nut and the receiving plate has a six-cornered or even a twelve-cornered countersink. This makes it possible to adjust in steps of 60° or even 30°. A structural component part of this kind can preferably be produced by injection molding.

Alternatively, however, the plates can be produced by stamping techniques.

BRIEF DESCRIPTION OF THE INVENTION

The invention will be explained in more detail in the following with reference to embodiment examples shown in the drawing.

FIG. 6 shows a view of a modified embodiment form similar to FIG. 2;

FIG. 7 shows a top view of the arrangement according to FIG. 6;

FIGS. 8A, 8B, 8C and 8D show four different views of the receiving plate used in FIGS. 6 and 7;

FIG. 9 shows a top view of a hexagon coupling nut suitable for use as a received plate;

FIG. 17 shows a top view of an embodiment form for groove profiles;

FIG. 18 shows a sectional view along section line XVIII—XVIII in FIG. 17; and

FIG. 19 shows a sectional view along section line XIX—XIX in FIG. 17; and

DESCRIPTION OF THE PREFERRED EMBODIMENTS

Figure 14:
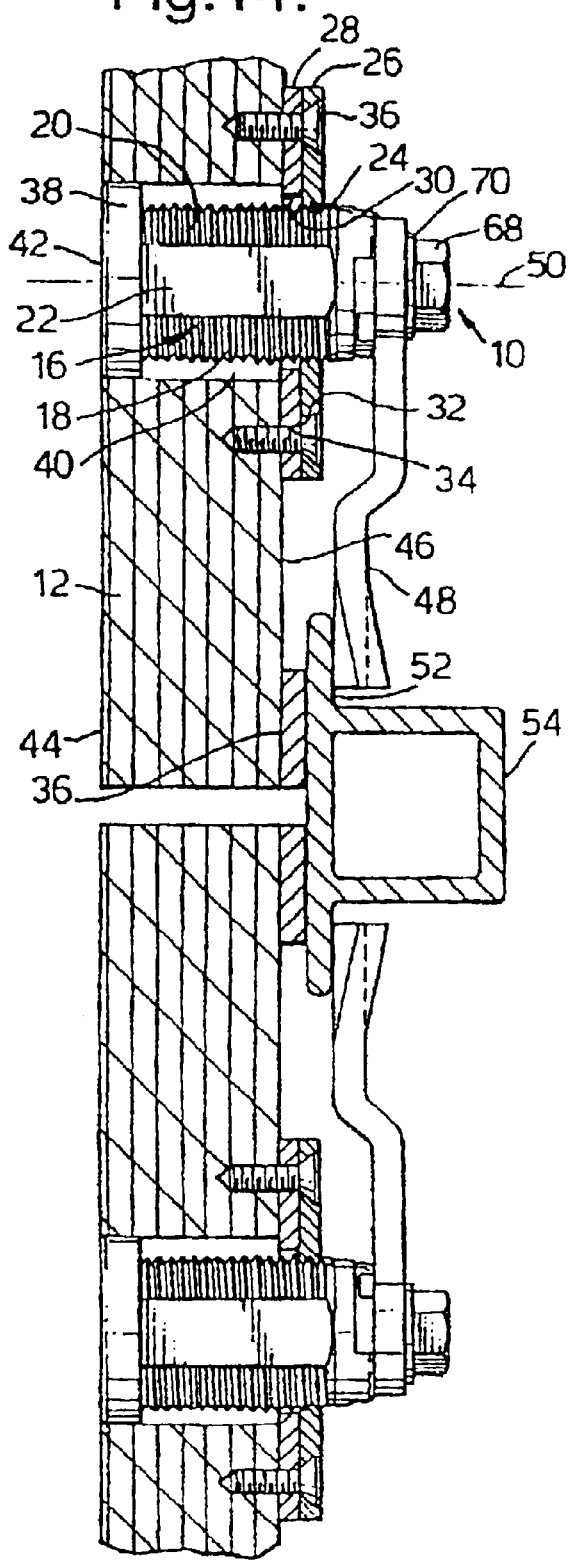
FIG. 14 is a cross-sectional view showing a case of application for a casement fastener closure similar to the type mentioned in the beginning.
Figure 15:
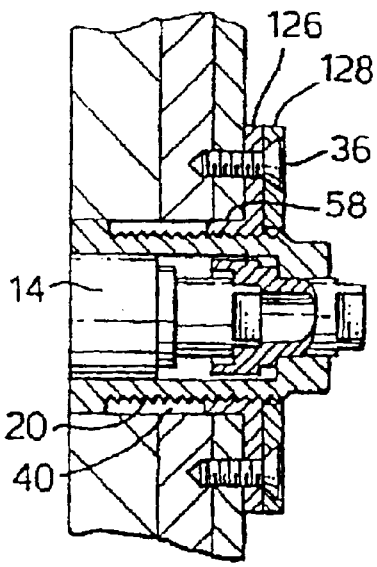
FIG. 15 is a view in axial section showing a casement fastener closure without a tongue for purposes of illustration.

FIG. 14, which will be discussed first, shows a casement fastener closure 10 for a thick-walled door or shutter 12 with a housing 16 which rotatably supports the actuating shaft 14 (see FIG. 15) and which has, at its circumference 18, a thread 20 and at least one, but usually four, axially extending flattened portions 22 which are offset by 90° relative to one another. A fastening plate 26 provided with a threaded bore hole 24 can be screwed onto the thread 20 on the circumference 18 of the housing 16 and a second plate 28 with an opening 30 which is not round and which, for example, is adapted to the flattened portion 22 and is narrowed in a chord-like manner can be mounted on the housing 16. Due to the non-circular shape, the plate 28 cannot rotate relative to the housing 16 but may be axially displaceable.

The two plates 26, 28 have bore holes 32, 34 which are aligned with one another in a certain rotational position; fastening screws, for example, in the form of wood screws 36, are inserted through the bore holes 32, 34 and can then be screwed into the material of the thick-walled door 12, for example.

In this case, the housing has a collar or key interceptor 38 projecting over the cross section of the circumferential thread 18, and the door leaf 12 has a round opening 40 with a diameter such that the housing can fit through with its collar 38, specifically, until the end face 42 of the housing 16 or collar 38 is flush with the outer surface 44 of the door leaf or shutter 12. The plate 28 can then be slid onto the housing 16 until the plate 28 contacts the inner surface 46 of the door leaf. The plate 28 makes it possible for the housing 16 to be fixed with respect to rotation relative to the round door opening 40, but still does not hold the housing 16 in the axial direction; this is achieved by the plate 26 which can be screwed on. It is screwed on until reaching the position shown in FIG. 14 and is then brought into a position such that the opening 32 for the fastening screw 36 is flush with a corresponding bore hole 34 in the other plate 28, whereupon the above-mentioned fastening screws 36 can be inserted and screwed into the door leaf 12, so that the two plates are fixed jointly and it is now possible for the housing 16 to be secured also axially with the plate 26. By means of the drive shaft, not shown in more detail here, a tongue 48 can swivel about the axis of the drive shaft 50; during this swiveling movement, the tongue 48 runs onto the stopping surface 52, for example, of a frame or cabinet profile 54, and the door or shutter 12 accordingly presses against the profile 54 with its inner surface 46 and a sealing strand 36 which is placed therebetween, for example, and accordingly holds the door or shutter 12 in the closed position. Another door or shutter shown in FIG. 14 is constructed and arranged in a mirror-symmetric manner.

A disadvantage in the construction shown in FIG. 14 consists in the fact that the thread of the plate 26 is relatively narrow and must be limited to the thickness of the plate. This limits the strength of the arrangement. A further disadvantage consists in that both plates 28 and 26 have two holes which are offset relative to one another by 180° around the casement fastener shaft axis. They are only aligned when both plates are oriented in a determined position relative to one another. This means that plate 26 or plate 28 must be turned by 180° to achieve a new alignment position. Therefore, plane 42 can be oriented relative to plane 44 exactly by a half thread turn at most. If the casement fastener housing does not have four flattened portions offset by 90° but, rather, e.g., only two flattened portions offset by 180° or only one flattened portion, the arrangement can also not be converted from a right-hand arrangement to a left-hand arrangement because this requires a 90-degree rotation of the housing.

Figure 16:
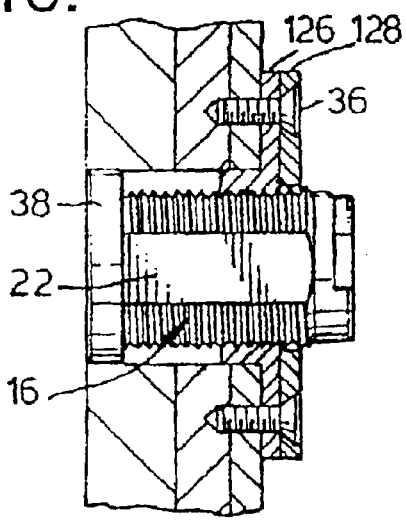
FIG. 16 shows a side view of the arrangement according to FIG. 15.

These disadvantages are overcome by the additional features and embodiment forms to be described in the following. Accordingly, the embodiment form according to FIG. 15 and 16 already represents an improvement insofar as the plate 126 provided with a threaded bore hole has an annular shoulder 58 which, for example, triples the total length of the thread of the threaded plate 126. Since the shoulder is formed in such a way that it can be received in the opening space 40 formed by the door leaf 12, it does not interfere with the spatial ratios and also makes it possible to use the plate 128 which can be mounted, which prevents unwanted rotation of the housing 16 when the two plates 126, 128 are fixed by fastening screws 36 as was already described. However, there still remains the disadvantage that at least a half revolution is needed for the two plates 126, 128 to be aligned with respect to their openings.

Figure 1:
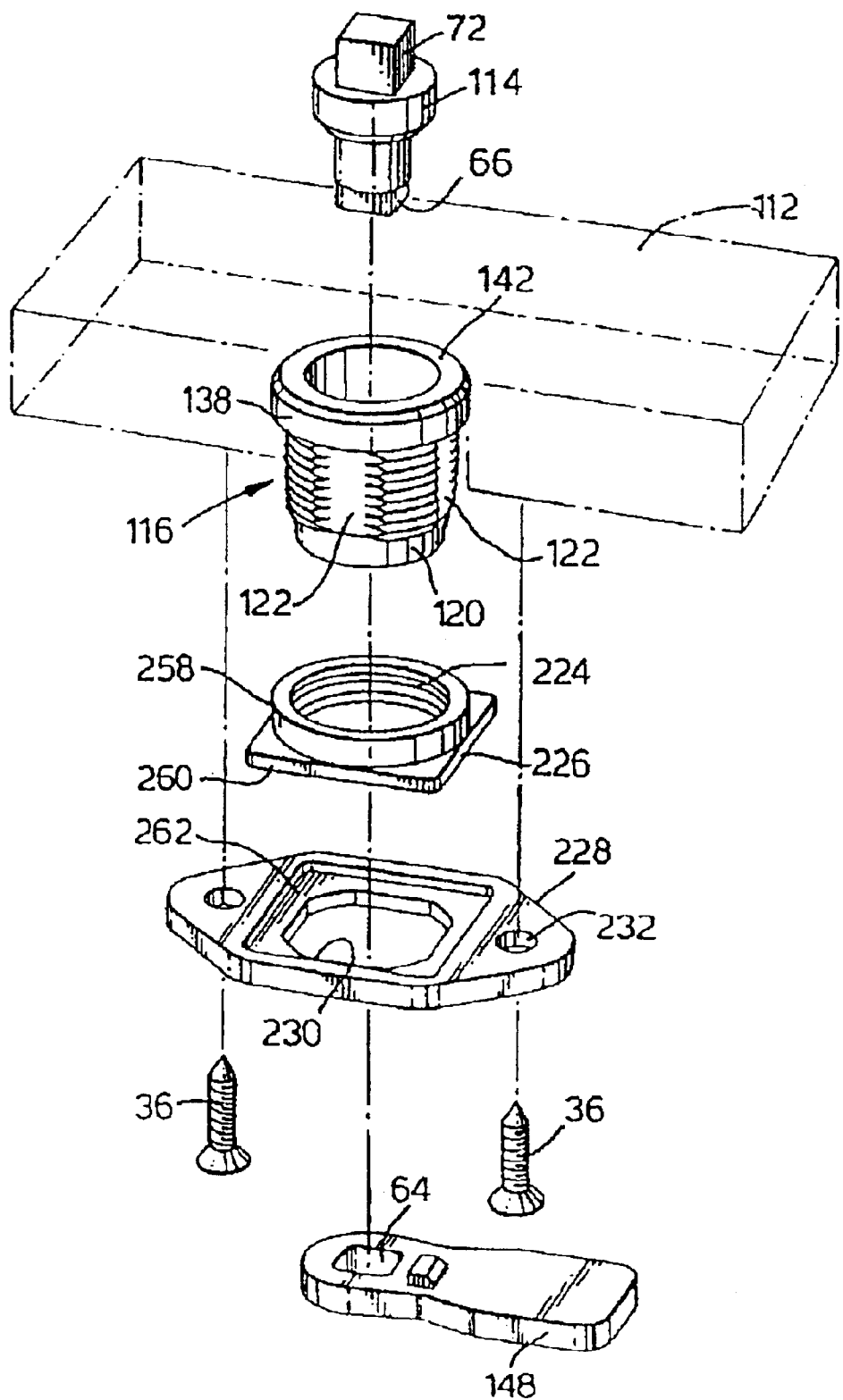
FIG. 1 shows a first embodiment form of the casement fastener closure arrangement according to the invention in an exploded view.

FIG. 1 shows an embodiment form in which an improvement is achieved also in this respect. In this case, a housing 116 is arranged in a door leaf 112 with a collar 138 which again fits exactly into the bore hole of the door 112, with circumferential thread 120 and flattened portions 122. The plate 226 can now be screwed onto the circumferential thread 120 by its internal thread 224, wherein the internal thread is also lengthened by a shoulder 258 in this case, and the shoulder can again be inserted into the bore hole formed by the door leaf 112. The plate 224 no longer has any bore holes in its base 260 as was still the case in the embodiment form according to FIG. 15; instead, the base 260 has the shape of a square, this base 260 being receivable in a recess 262 which is formed by the plate 228 that can be mounted on the housing 116. Only this plate 228 then has openings 232 in order to fasten the plate 228 to the door leaf 112 by means of screws 36 in the manner already described. The advantage of the embodiment form shown in FIG. 1 consists in that the structural component part 226 can be secured so as to be offset at an angle of 90° with respect to the structural component part 228. In the embodiment form according to FIGS. 15 or 16, a rotation by 180° was still required. This doubles the adjusting accuracy. The possibility of 90-degree displacement also makes it possible to convert from a right-handed arrangement to a left-handed arrangement.

The arrangement according to FIG. 1 is stopped in that, for example, the housing 116 is inserted into the bore hole in the door leaf 112 from the rear with the actuating rod 114 inserted and the casement fastener tongue 148 attached, wherein the plate 226 is screwed onto the thread 120 of the housing 116 until the surface 142 of the collar 138 is exactly flush with the front of the door leaf or shutter 112. Subsequently, the plate 228 is mounted on the inner end of the housing, specifically, in such a way that the base 260 of the plate 226 is received so as to fit into the countersink 162. In so doing, the entire arrangement is rotated in such a way that the circumference of the housing 116 can be guided through the opening 230 with its flattened portions 122, wherein this opening 230 can be closely adapted to the circumferential shape of the housing 116. The tongue 148 according to FIG. 1 is not bent, in contrast to the view in FIG. 14; under certain circumstances, the bend facilitates fitting the plate 226, 228 when the tongue 148 is already mounted. If problems should arise when fitting the plate 226, 228, the tongue 148 could be omitted at first and not mounted until later.

The tongue 148 is attached to the square 66 of the rod 114 by its square opening 64 and fixed by means of a screw 70, not shown here, e.g., with the intermediary of a washer 68, see FIG. 14.

A key which engages with the square part 72 of the rod according to FIG. 1 is used to actuate the casement fastener closure which is produced in this way.

Figure 2:
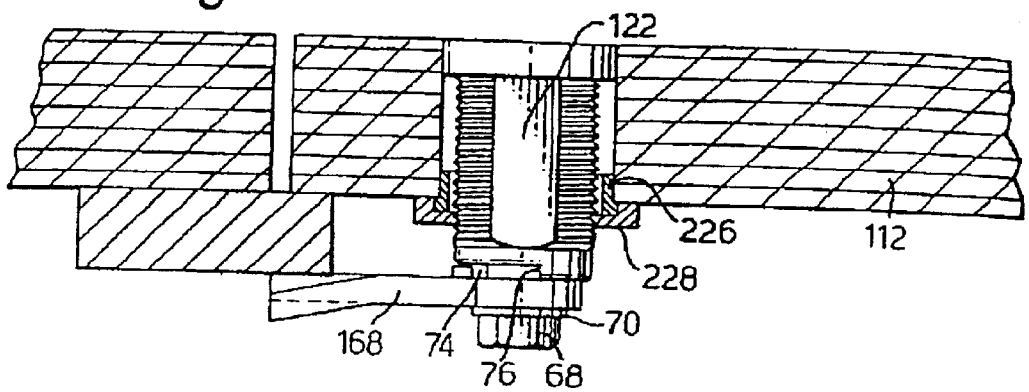
FIG. 2 is an axial sectional view showing the casement fastener closure shown in FIG. 1 in the installed state.
Figure 3:
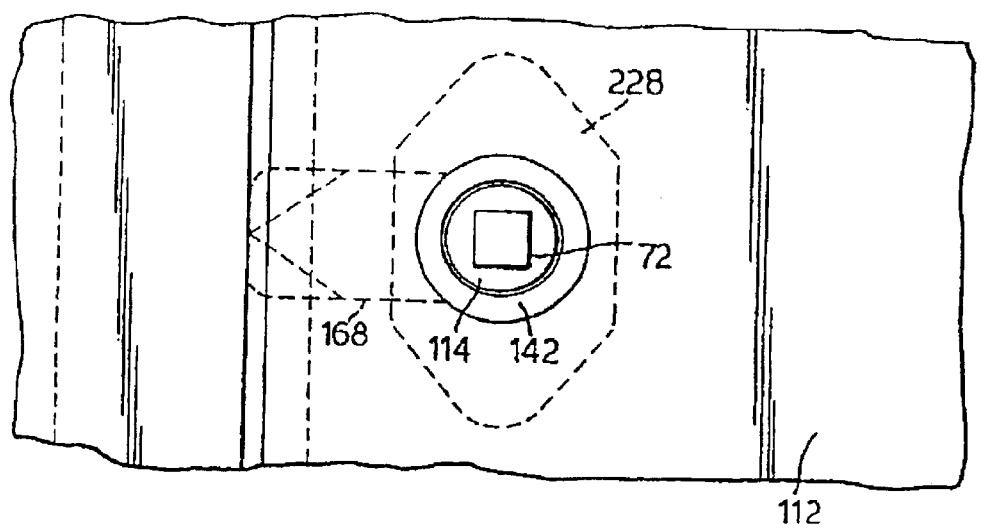
FIG. 3 is a top view of the arrangement according to FIG. 2.

FIG. 2 shows the casement fastener closure shown in FIG. 1 in the assembled and installed state; it can be seen in this case that the rotating movement of the tongue 268 is limited to a rotational angle of 90°, for example, by a stop projection 72 of the tongue and stop faces 74, 76 of the housing in order to afford the user both end positions of the tongue, closed as shown in FIG. 3 or opened. When the housing is turned by 90° (or 270°) relative to the stop face, the right-hand closure becomes a left-hand closure, see the two closures in FIG. 14, wherein the closure at the top closes in the clockwise direction and the closure at the bottom closes in the counterclockwise direction.

Figure 4A:
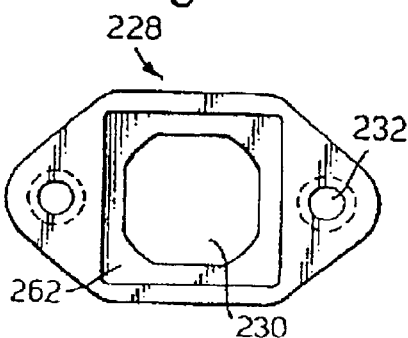
FIGS. 4A and 4B show a top view and a side view of the receiving plate in the embodiment form shown in FIGS. 2 and 3.
Figure 4B:
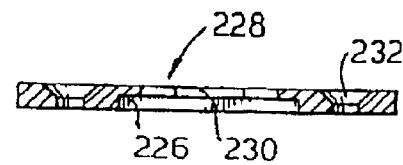
Figure 5A:
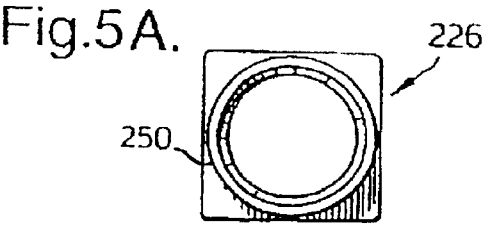
FIGS. 5A and 5B show a top view and a side view of the received plate according to the embodiment form in FIGS. 2 and 3.
Figure 5B:
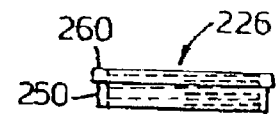
Figure 10:
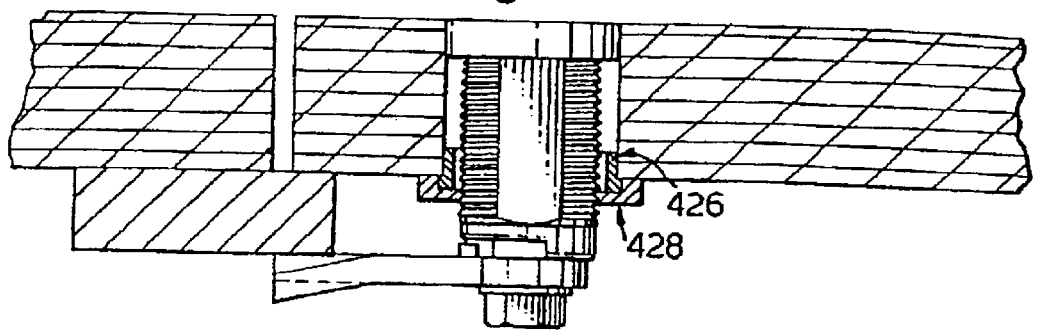
FIG. 10 shows a view, similar to that in FIG. 2, of another embodiment form of the invention.
Figure 11:
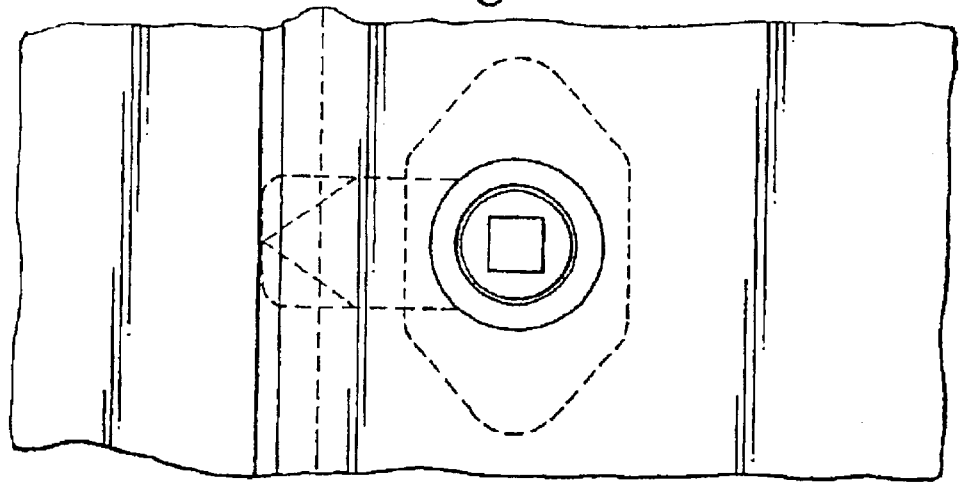
FIG. 11 shows a top view of the arrangement according to FIG. 10.
Figure 12A:
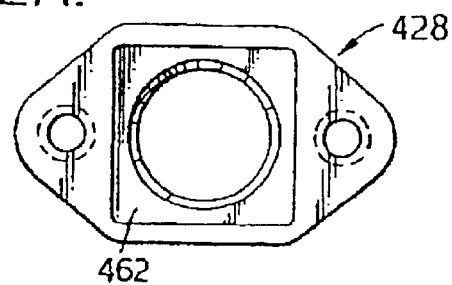
FIGS. 12A and 12B show a top view and a side view of the receiving plate according to FIGS. 10 and 11.
Figure 12B:
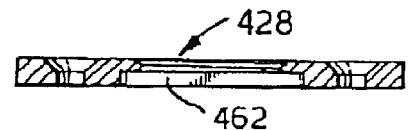
Figure 13A:
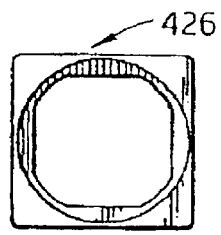
FIGS. 13A and 13B show a top view and a side view of the received plate according to the embodiment form according to FIGS. 10 and 11.
Figure 13B:
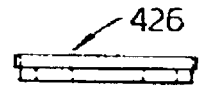

FIGS. 4A, 4B show a view of the structural component part 228 and also show that the openings 232 for the fastening screws can be constructed as countersink head openings.

FIGS. 6 and 7 show an embodiment form in which the plate provided with a thread is formed by a standard hexagon coupling nut 326 which is shown again in FIG. 9. In this case, the overall height is somewhat larger than in FIG. 2, but the hexagonal shape of the nut 326 already makes it possible to triple the adjusting accuracy of 60° (it was 90° in FIG. 2).

When the plate receiving the nut 326 is constructed according to FIGS. 8A to 8D, that is, with a countersink 362 having a total of 12 corners which can receive the 6 corners of the nut 326 by an offset of 30° in each instance, this results in a still greater, sextupled adjusting accuracy of 30°, respectively.

The opening 330 for receiving the housing circumference is designed similar to the embodiment form according to FIG. 4A. In this case, also, bore holes, preferably countersink bore holes 332, are again provided for the fastening screws.

In the embodiment form shown in FIGS. 10 to 13, the plate 428 that can be screwed on is that plate 428 which receives, in a countersink 462, the plate 426 that can be mounted. However, the embodiment form is less advantageous because, in this case, the thread has a short length and the assembly is complicated.

FIG. 17 shows a top view of an embodiment form for groove profiles. In this case (see also FIG. 18, a sectional view along line XVIII—XVIII of FIG. 17), the door or shutter 412 as well as the associated housing or frame 416 are formed by profiles 47 which are essentially rectangular or square in cross section and which have undercut grooves 49 on their four sides. The profiles are piece goods in which a transverse bore hole 51 can be introduced by means of a suitable tool, this transverse bore hole 51 leaving sufficient material such that stability is not impaired. This bore hole or opening 51 can then receive a housing 416 in the manner already described. In this case also, the circumference of the housing 416 has a thread, wherein a fastening plate 426 can be screwed onto the end of this thread and secured by means of a second plate 428 to the contacting surface of the profile; at the same time, the housing 416 is fixed with respect to rotation by this plate 428 in a manner similar to that already explained, for example, in FIGS. 1 and 2. Screws 436 are used to secure the plate 428; these screws 436 are either screwed into separately cut threaded bore holes or, if, as described, the undercut grooves are present, groove blocks 53 are arranged in this groove and the screws 436 can be screwed into the latter.

Particularly stable ratios result when the axis of the opening 51 for the housing 416 and the longitudinal axis of the profile intersect at right angles. In this case, the axes of the openings for the screws 436 and the axis of the opening for the housing 416 lie on a line, namely, the center line of the respective groove 49.

This construction with profiles with undercut grooves can be used in a particularly varied manner and also, for example, allows stop strips 57 to be fastened to a profile 47 of a housing 416 for exact alignment of the profile of a respective door or shutter 412 and, at the same time, to form a surface 452 behind which the casement fastener 468 engages. In order to receive the plate 428, this stop strip 57 can be provided with a notch 55 such as is shown in FIG. 17 in dashed lines (as a concealed line) and in FIG. 19 a sectional view along line XIX—XIX of FIG. 17.

In this case, the strip 57 is likewise fastened by screws which are held by groove blocks.

Figure 20:
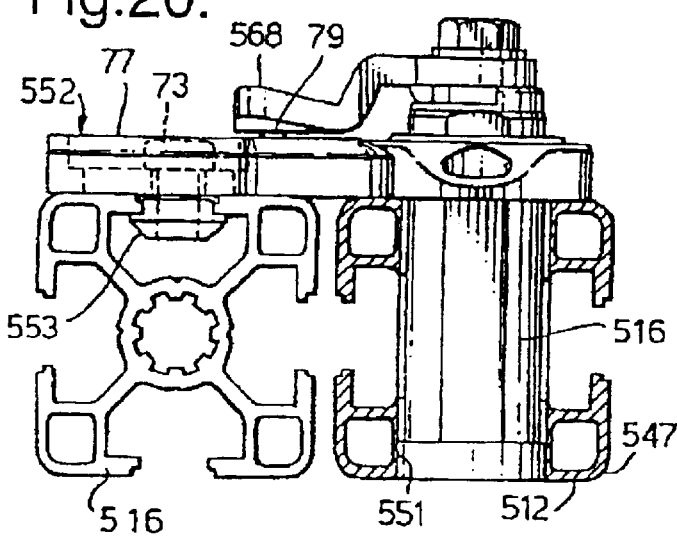
FIG. 20 shows another embodiment form of the invention in a view similar to that in FIG. 18.

FIG. 20 shows a further development of the embodiment form shown in FIG. 18 in a view similar to FIG. 18. Instead of the strip 452 shown in FIG. 18, a stop plate 552 shown in a top view in FIG. 22 and again in various views in FIGS. 23A to 23E is provided in this case for every closure.

Figure 22:
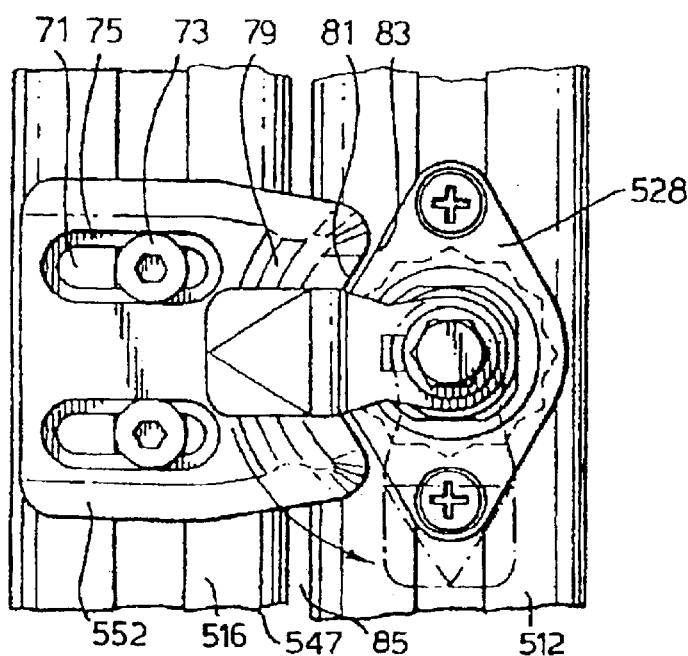
FIG. 22 shows a view from the back of the embodiment forms according to FIGS. 20 and 21.
Figure 23A:
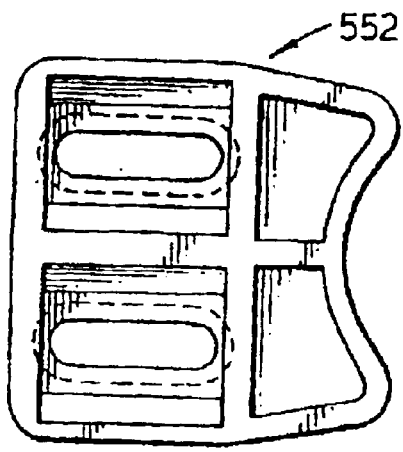
FIGS. 23A to 23F show various views of a stop plate which is used according to the embodiment forms of FIGS. 20, 21 and 22.
Figure 23B:
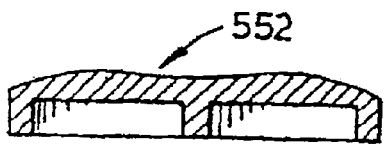
Figure 23C:
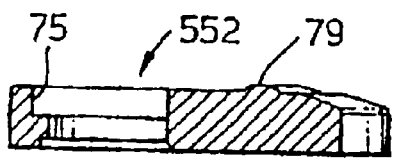
Figure 23D:
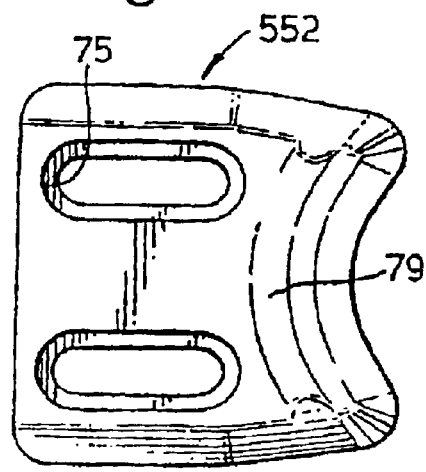
Figure 23E:
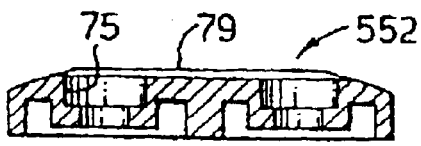
Figure 23F:
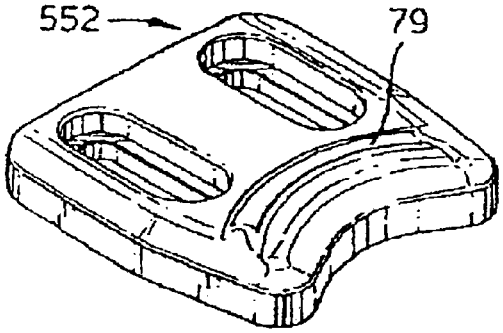

This stop plate makes it possible to adapt the holding plate 528 in a particularly exact manner and to obtain a particularly high degree of stability. In addition, by bending the tongue 568, the thickness of the stop plate 552 can be reduced. Further, it is noted that it is possible to make the stop plate 552 displaceable vertical to the extension of the groove by providing elongated holes 71 through which are guided screw bolts 73 provided with groove blocks, wherein the head of the screw bolt 73 can be countersunk in a corresponding countersink 75 of the elongated hole 71 until it no longer projects over the undercut plane 77 of the plate 552. A bead 79 is advisably provided in the area of the stopping surface 73 for the casement fastener 568; this bead 79 projects over the plane 77 so that if the part 552 is painted it will not be damaged over the surface but only in a line when the casement fastener tongue 568 slides over it. The bead 79 is advantageously arranged in the form of a partial circle, wherein the center of the partial circle should be located approximately in the axis of the casement fastener; a possible corresponding adjustment of the distance between the casement fastener closure, or its holding or fastening plate 528, and the stop plate 552 is facilitated by the elongated holes 71. Further, as can be seen in FIG. 22, the shape of the plate 552 is adapted to the holding plate which is pulled on over the coupling nut 426 such that the distance between the respective abutting edges 81 and 83 of the stop plate 552 and the holding plate 528 is roughly 1 mm or less, for example.

Due to the fact that the two parts are formed so as to engage around one another or mesh into one another as is shown, displacement in the direction of the door edge or shutter edge 85 is also advantageously prevented, which results in an embodiment form with particularly high stability and multiple possible uses.

Figure 21:
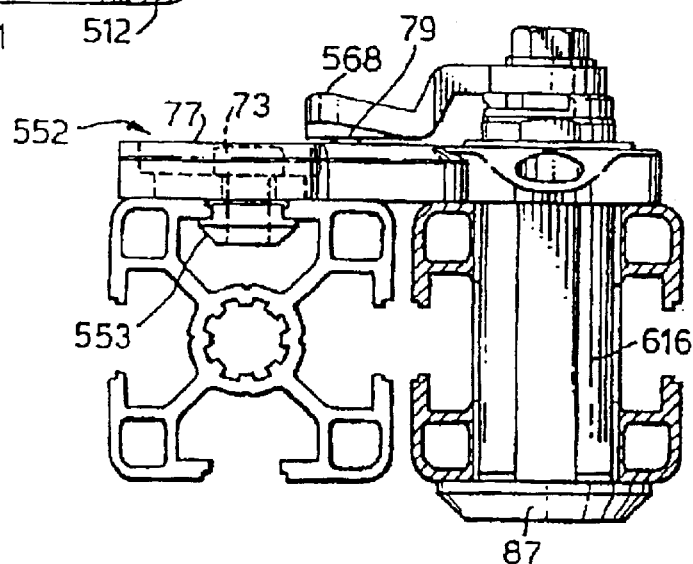
FIG. 21 shows another embodiment form of the invention in a view similar to that in FIG. 18.

FIG. 21 shows that the system of the special casement fastening in a round hole also functions when the housing has a head or flange 87. However, in this case, for purposes of assembly the casement fastener 568 must first be removed in order for the housing 616 to be guided into the bore hole 551 in the profile 547 by its rear end. In the absence of a head or flange, see FIG. 20, the housing 516 can be introduced from the front without interference from the tongue 568.

The invention can be utilized commercially in switch cabinet construction, for example.

While the foregoing description and drawings represent the present invention, it will be obvious to those skilled in the art that various changes may be made therein without departing from the true spirit and scope of the present invention.

What is claimed is:

1. A casement fastener closure for thick-walled doors or shutters comprising:

a housing for rotatable mounting of the actuating shaft of the casement fastener;

said housing having, at its circumference, a thread and axially extending flattened portions or recesses;

a fastening plate being provided with a threaded bore hole for the circumferential thread of the housing for being screwed onto the housing and, together with another plate, having an opening that is not round and which can be mounted on the housing so as to be rigid against rotation for being fastened to the back of the door, shutter or the like by wood screws;

said plate that can be mounted forming a recess in which the plate which can be screwed on can be received so as to be fixed with respect to rotation.

2. A casement fastener closure for thick-walled doors or shutters comprising a housing for rotatable mounting of the actuating shaft of the casement fastener;

said housing having, at its circumference, a thread and axially extending flattened portions or recesses;

a fastening plate being provided with a threaded bore hole for the circumferential thread of the housing for being screwed onto the housing and, together with another plate, having an opening that is not round and which can be mounted on the housing so as to be rigid against rotation for being fastened to the back of the door or shutter by wood screws;

said plate that can be screwed on forming a recess in which the plate which can be mounted can be received so as to be fixed with respect to rotation.

3. The casement fastener closure according to claim 1, wherein, in the area for receiving for an actuating key, the housing forms a collar or key interceptor projecting over the cross section of the external thread, wherein the receivable plate forms a first axial portion having a round outer contour with a diameter which is approximately equal to the outer diameter of the collar and a second receivable cross section with an outer contour which is not round but square and with a maximum diameter like a transverse connection between two oppositely located corners of the square which is greater than the outer diameter of the collar.

4. The casement fastener closure according to claim 1, wherein the received plate has the shape of a conventional hexagon coupling nut and the receiving plate has a six-cornered or twelve-cornered countersink.

5. The casement fastener closure according to claim 1, wherein the receiving plate is an injection-molded part.

6. The casement fastener closure according to claim 1, wherein the receiving plate is a stamped part.

7. The casement fastener closure according to claim 1, wherein the plate provided with a threaded bore hole has an annular shoulder which increases the axial length of the threaded bore hole.

8. The casement fastener closure according to claim 7, wherein the shoulder can be received in the opening formed in the door leaf.

9. The casement fastener closure according to claim 8, wherein the shoulder has an outer diameter adapted to that of the collar.

10. The casement fastener closure according to claim 1, wherein the casement fastener housing is arranged in an opening in a profile having an undercut groove, wherein the fastening screws for the plate which can be mounted on the housing so as to be rigid against rotation are held by groove blocks arranged in the groove.

11. The casement fastener closure according to claim 10, wherein the axis of the opening and the axis of the profile intersect at right angles.

12. The casement fastener closure according to claim 1, wherein the casement fastener tongue has a bend directed toward the supporting surface.

13. The casement fastener closure according to claim 1, wherein the casement fastener tongue slides on a stop plate which is fastened to the frame at which the door or shutter is articulated or arranged.

14. The casement fastener closure according to claim 13, wherein the stop plate has an outer contour which is directed toward the fastening plate and which is adapted to mesh with, the outer contour of the fastening plate for the casement fastener closure.

15. The casement fastener closure according to claim 13, wherein the stop plate has a bead in the area of the stop face for the casement fastener tongue, which bead projects over the plane.

16. The casement fastener closure according to claim 15, wherein the bead forms a partial circle around the axis formed by the casement fastener closure.

17. The casement fastener closure according to claim 15, wherein the stop plate has two elongated holes for receiving fastening screws that are screwed into groove blocks received by the profiles.

18. The casement fastener closure according to claim 17, wherein the elongated holes form a countersink for the head of the fastening screw.

* * * * *